(12) United States Patent
Teo et al.

(10) Patent No.: US 10,153,702 B2
(45) Date of Patent: Dec. 11, 2018

(54) SWITCHED-MODE POWER SUPPLY CONTROLLER USING A SINGLE PIN FOR BOTH INPUT VOLTAGE SENSING AND CONTROL OF POWER SUPPLY CHARGING

(71) Applicant: Infineon Technologies Austria AG, Villach (AT)

(72) Inventors: Yong Siang Teo, Singapore (SG); Xiaowu Gong, Singapore (SG); Kok Kee Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 59 days.

(21) Appl. No.: 15/426,647

(22) Filed: Feb. 7, 2017

(65) Prior Publication Data

US 2018/0226894 A1 Aug. 9, 2018

(51) Int. Cl.
*H02M 3/335* (2006.01)
*H02M 1/36* (2007.01)
(Continued)

(52) U.S. Cl.
CPC ......... *H02M 3/33523* (2013.01); *H02M 1/08* (2013.01); *H02M 1/36* (2013.01);
(Continued)

(58) Field of Classification Search
CPC ...... H02M 3/33523; H02M 1/08; H02M 1/36; H02M 2001/0009; H02M 2001/0048; H02M 2001/0006; H02M 3/335
See application file for complete search history.

(56) References Cited

U.S. PATENT DOCUMENTS

| 5,282,107 A | 1/1994 | Balakrishnan |
|---|---|---|
| 5,285,369 A | 2/1994 | Balakrishnan |
| (Continued) | | |

FOREIGN PATENT DOCUMENTS

| DE | 19513065 A1 | 10/1996 |
|---|---|---|
| DE | 19620034 C2 | 4/1998 |
| (Continued) | | |

OTHER PUBLICATIONS

"AC/DC Buck Controller with PFC for LED Lamps", ICL8201, Infineon Data Sheet, Revision V2.0 May 25, 2015, pp. 1-40.
(Continued)

*Primary Examiner* — Fred E Finch, III
*Assistant Examiner* — Demetries A Gibson
(74) *Attorney, Agent, or Firm* — Murphy, Bilak & Homiller, PLLC

(57) ABSTRACT

Circuits and methods within a switched-mode power supply (SMPS) controller are provided. The SMPS controller includes an SMPS power stage which is integrated within the same package, and which has a first power switch. The first power switch is used to supply current to a power supply for the SMPS controller during a start-up phase of the SMPS, thereby charging this power supply prior to normal operational mode of the SMPS. A lead of the SMPS controller is connected to a control terminal of the first power switch during the start-up phase. After the start-up phase, this same lead is instead routed to an input source voltage monitor, and is used for detecting overvoltage or undervoltage conditions at the SMPS input power source.

20 Claims, 8 Drawing Sheets

(51) Int. Cl.
*H02M 1/08* (2006.01)
*H02M 1/00* (2006.01)

(52) U.S. Cl.
CPC .... *H02M 3/335* (2013.01); *H02M 2001/0006* (2013.01); *H02M 2001/0048* (2013.01)

(56) References Cited

U.S. PATENT DOCUMENTS

| | | | |
|---|---|---|---|
| 5,673,185 A | 9/1997 | Albach et al. | |
| 5,995,384 A * | 11/1999 | Majid | H02M 3/33523 323/902 |
| 7,339,359 B2 * | 3/2008 | Choi | H02M 3/33523 323/284 |
| 7,486,529 B2 * | 2/2009 | Sukup | H02M 1/36 323/901 |
| 8,017,996 B2 | 9/2011 | Kaneko | |
| 8,310,281 B2 | 11/2012 | Draxelmayr et al. | |
| 8,411,471 B2 | 4/2013 | Willmeroth et al. | |
| 9,837,917 B1 * | 12/2017 | Furtner | H02M 3/33523 |
| 9,991,787 B2 * | 6/2018 | Zhang | H02M 3/33523 |
| 2006/0097770 A1 | 5/2006 | Disney | |
| 2006/0196757 A1 * | 9/2006 | Choi | H02M 1/36 200/50.38 |
| 2006/0262577 A1 | 11/2006 | Schenk | |
| 2006/0268584 A1 | 11/2006 | Disney | |
| 2007/0064451 A1 | 3/2007 | Stanley | |
| 2008/0089100 A1 | 4/2008 | Park et al. | |
| 2008/0130324 A1 | 6/2008 | Choi et al. | |
| 2010/0259952 A1 * | 10/2010 | Zhu | H02M 1/36 363/20 |
| 2011/0069420 A1 * | 3/2011 | Chiu | H02M 1/36 361/91.1 |
| 2011/0187335 A1 | 8/2011 | Grakist et al. | |
| 2011/0273912 A1 * | 11/2011 | Kim | H02M 3/33523 363/21.09 |
| 2013/0057173 A1 * | 3/2013 | Yao | H05B 33/0815 315/206 |
| 2013/0329472 A1 * | 12/2013 | Chen | H02H 7/1252 363/53 |
| 2013/0343095 A1 * | 12/2013 | Zhu | H02M 1/4258 363/21.01 |
| 2013/0343101 A1 * | 12/2013 | Zhang | H02M 3/33523 363/21.18 |
| 2014/0055174 A1 * | 2/2014 | Knoedgen | H02M 1/36 327/109 |
| 2014/0062544 A1 | 3/2014 | Weis et al. | |
| 2014/0062585 A1 | 3/2014 | Weis | |
| 2014/0112028 A1 | 4/2014 | Fahlenkamp et al. | |
| 2014/0112030 A1 | 4/2014 | Fahlenkamp | |
| 2014/0160805 A1 | 6/2014 | Oh et al. | |
| 2014/0204622 A1 | 7/2014 | Telefus | |
| 2014/0368742 A1 | 12/2014 | Joo et al. | |
| 2015/0062544 A1 | 3/2015 | Ershov | |
| 2015/0263646 A1 | 9/2015 | Hara et al. | |
| 2015/0280573 A1 * | 10/2015 | Gong | H02M 3/33523 363/21.14 |
| 2015/0280576 A1 | 10/2015 | Hinz et al. | |
| 2015/0280592 A1 * | 10/2015 | Hu | H02M 3/156 363/21.04 |
| 2015/0349652 A1 | 12/2015 | Lefedjiev et al. | |
| 2016/0099649 A1 | 4/2016 | Hara et al. | |
| 2016/0352237 A1 * | 12/2016 | Quigley | H02M 3/33546 |
| 2017/0005583 A1 * | 1/2017 | Choi | H02M 3/33553 |
| 2017/0033788 A1 * | 2/2017 | Fujii | H03K 17/223 |
| 2017/0324340 A1 * | 11/2017 | Yang | H02M 3/33507 |

FOREIGN PATENT DOCUMENTS

| | | |
|---|---|---|
| DE | 102006041545 A1 | 4/2007 |
| EP | 1499005 A1 | 1/2005 |
| ES | 2178583 A1 | 12/2002 |
| WO | 9857417 A1 | 12/1998 |
| WO | 2014067915 A2 | 5/2014 |

OTHER PUBLICATIONS

"Cascode Structure Single Stage Floating Buck Topology", LED Driver IC, ICL8201, Target Data Sheet, Version 1.0, Aug. 25, 2014, Power Management & Multimarket, Infineon Technologies AG, pp. 1-39.

Granig, Wolfgang, "Resonant Decoupled Auxiliary Supply for a Switched-Mode Power Supply Controller", U.S. Appl. No. 15/009,000, filed Jan. 28, 2016.

Herfurth, Michael et al., "Auxiliary Supply for a Switched-Mode Power Supply Controller Using Bang-Bang Regulation", U.S. Appl. No. 14/974,668, filed Dec. 18, 2015.

* cited by examiner

SWITCHED-MODE POWER SUPPLY CONTROLLER USING A SINGLE PIN FOR BOTH INPUT VOLTAGE SENSING AND CONTROL OF POWER SUPPLY CHARGING

TECHNICAL FIELD

The present application relates to circuits and methods within a switched-mode power supply (SMPS) controller and an SMPS powerstage, which are integrated within the same package. More particularly, the disclosed techniques are directed to using an SMPS controller pin for sensing an input voltage level of the SMPS during a normal operating phase of the SMPS, and using the same SMPS controller pin to enable a power switch that charges an SMPS controller power supply during a start-up phase of the SMPS.

BACKGROUND

Switched-mode power supplies (SMPS) are widely used for providing power to loads such as computers, television sets, lighting systems, home appliances and other electronic devices. As with other types of power supplies, an SMPS converts electrical power from a power source into a form more appropriate for a load. In typical applications, the source power is obtained from an alternating current (AC) mains voltage with a frequency of 50 Hz to 60 Hz and root mean square (RMS) voltage levels of 90V to 240V. The SMPS typically converts this source power into a lower-voltage direct current (DC) power that is supplied to the load.

SMPS have several advantages over other power supply types. SMPS are often significantly more efficient than other power supply types, as SMPS waste less energy in ohmic losses, e.g., as done by power supplies relying on linear regulation. Because wasted energy must typically be dissipated as heat, SMPS have reduced heat dissipation requirements meaning fewer and/or smaller heat sinks are required. Furthermore, many SMPS configurations require no transformer, while other SMPS configurations require a transformer that is significantly smaller than is required by other power supply types. For these reasons, SMPS are often smaller and less expensive than other power supply types.

While there are many configurations for SMPS, all of them switch (enable and disable), at some level, power that is ultimately supplied to an output load. An SMPS controller governs this switching by varying parameters such as the frequency and/or duty cycle of a pulse-width-modulated (PWM) signal that is used to drive one or more switch devices, e.g., transistors, such that the output power supplied to the load meets the load's power requirements in terms of voltage and current.

The SMPS controller is, itself, an electronic device that must be powered. During the normal operational mode of the SMPS, the SMPS controller may be powered, e.g., by tapping the same output power that is supplying the load, or by using an auxiliary winding of a transformer within the SMPS. However, such power is only available after the SMPS has achieved steady-state (normal) operation. Some other means for supplying power to the SMPS controller is required during a start-up phase of the SMPS. One solution is to use an external power supply, but this requires extra circuitry, which undesirably increases the cost and size of the SMPS. Hence, techniques in which the SMPS self-starts its controller are preferred.

Many self-starting SMPS use an input DC power, e.g., on the primary side of an isolated (transformer-based) SMPS, to charge the power supply for the SMPS controller during the start-up phase of the SMPS. The SMPS controller power supply, henceforth denoted $V_{CC}$, is typically coupled to a capacitor, denoted $C_{VCC}$, which serves to smooth the power supply voltage during normal SMPS operational mode, and which may store energy for powering the SMPS controller during the start-up phase. In a simple solution, a start-up resistor connects an input DC power node to the SMPS controller power supply $V_{CC}$ and its capacitor $C_{VCC}$. During the start-up phase of the SMPS, current flows through the start-up resistor, and the voltage at $V_{CC}$ rises until it reaches an acceptable operational level for the SMPS controller, e.g., 16V. Once this occurs, the SMPS controller may begin normal operation.

However, the simple solution making use of a start-up resistor has two related problems: start-up speed and standby power consumption. If the resistance of the start-up resistor is relatively small, then the SMPS power supply $V_{CC}$ reaches an operational level quickly, but the SMPS standby and/or light-load power consumption is high due to the ongoing power loss in the start-up resistor. Conversely, a start-up resistor with a large resistance leads to lower standby and light-load power consumption, but the SMPS start-up time is high.

An improved solution that addresses these problems makes use of a dedicated power switch, sometimes termed a start-up cell, to supply current from the input DC power to the SMPS controller power supply $V_{CC}$ and its capacitor $C_{VCC}$ during the start-up phase of the SMPS. Yet another improved solution re-uses an existing power switch of the SMPS power stage, in a cascode configuration, rather than requiring a dedicated (separate) switch. Each of these solutions provides high current to the SMPS power supply $V_{CC}$ during the start-up phase, thereby providing a fast start-up time, but do not incur high standby power losses because current does not unnecessarily flow through the power switch during light-load or standby conditions. Use of a cascaded power switch for charging the SMPS power supply $V_{CC}$ requires that the power switch be controlled such that it is enabled (conducting) during the start-up phase, i.e., before the SMPS controller is operational, but that the powerswitch be disabled (not conducting) when current is not needed.

Circuits and methods for supplying power to an SMPS controller during a start-up phase of the SMPS are desired.

SUMMARY

According to an embodiment of an integrated controller and power stage for a switched-mode power supply (SMPS), the integrated controller and power stage includes a high-voltage supply lead, an input voltage lead, an SMPS controller, a first power switch, a controller power supply and a source voltage monitoring circuit. These elements are integrated within the same package. The high-voltage supply lead provides a first point of external electrical contact to the package, and the input voltage lead provides a second point of external electrical contact to the package. The controller power supply is configured to supply power to the SMPS controller. The first power switch is operable to connect the high-voltage supply lead to the controller power supply in order to charge the controller power supply during a start-up phase of the SMPS controller. The first power switch includes a first power switch control terminal that is coupled to the input voltage lead during the start-up phase of the SMPS controller. The SMPS controller is operable to couple the source voltage monitoring circuit to the input voltage lead during a normal operating phase of the SMPS controller, which follows the start-up phase.

According to an embodiment of a switched-mode power supply (SMPS), the SMPS includes an integrated controller and power supply as described above. The SMPS also includes a sense resistor coupled between the input voltage lead of the integrated controller and power stage, and a high-voltage supply of the SMPS. In addition, the SMPS includes a transformer having an auxiliary winding, wherein the auxiliary winding supplies power to the controller power supply during the normal operating phase of the SMPS controller. Alternatively, the SMPS includes a conversion circuit that converts an output power supplied to the load of the SMPS into a form that may be used to supply power to the controller power supply during the normal operating phase of the SMPS controller.

According to another embodiment, a method for charging a controller power supply is provided within an integrated controller and power stage for a switched-mode power supply (SMPS). The integrated controller and power stage includes a high-voltage supply lead, an input voltage lead, an SMPS controller, a first power switch, the controller power supply and a source voltage monitoring circuit, which are integrated within the same package. The method begins by detecting that an input voltage at the input voltage lead is above a switch turn-on threshold for the first power switch. Responsive to this detecting, the first power switch is turned on so as to connect the high-voltage supply lead to the controller power supply, thereby charging the controller power supply during a start-up phase of the SMPS controller. Subsequent to the start-up phase of the SMPS controller, the source voltage monitoring circuit is coupled to the input voltage lead, so that a normal operating phase of the SMPS controller may begin.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the following description.

DETAILED DESCRIPTION

Figure 1:
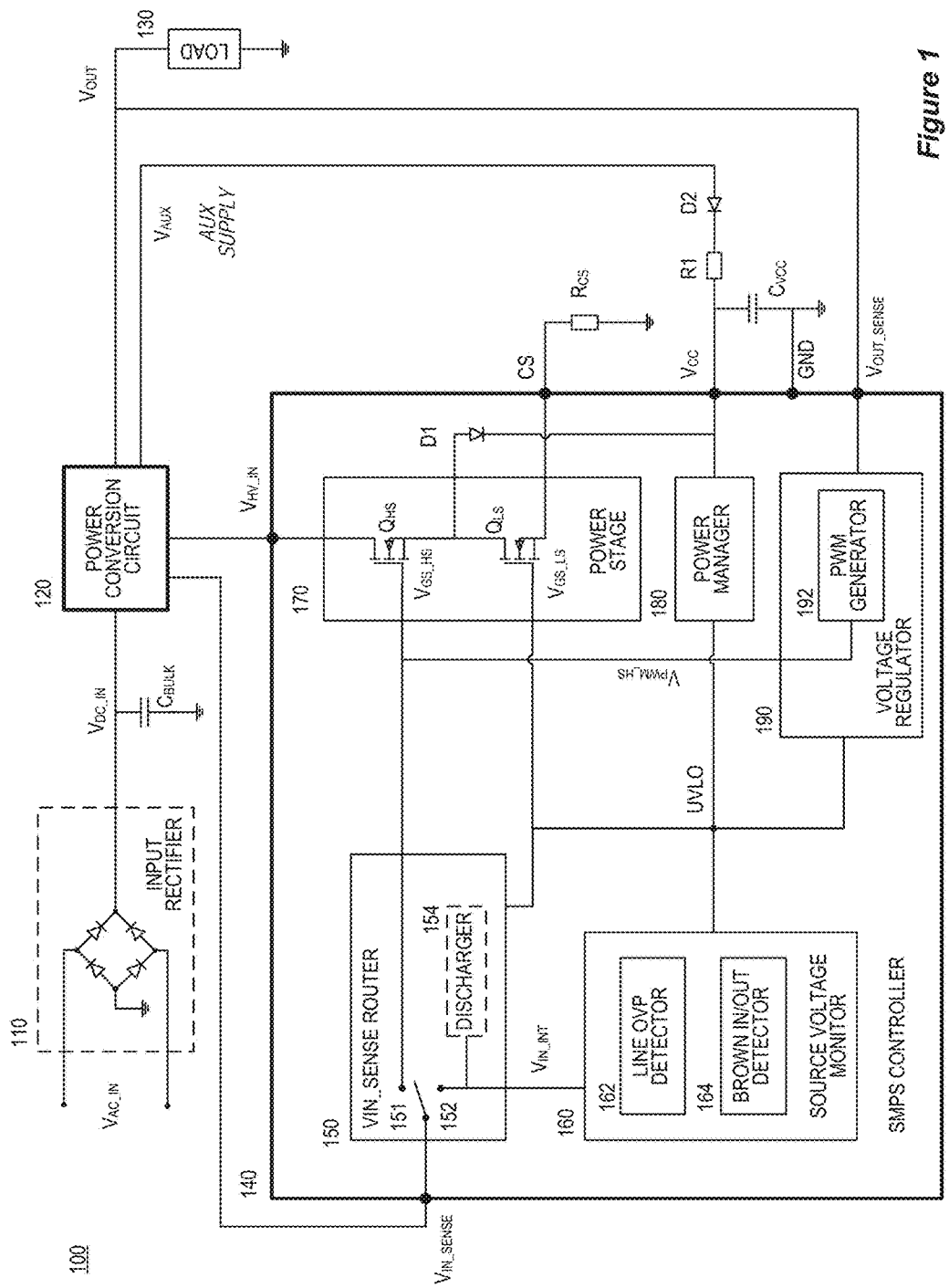
FIG. 1 illustrates a switched-mode power supply (SMPS) including an SMPS controller which uses a single pin for sensing an input voltage of the SMPS and for controlling the charging of the SMPS controller power supply.

Embodiments described herein provide circuits and methods for charging the power supply of a switched-mode power supply (SMPS) controller during a startup phase of the SMPS. The described techniques reduce the circuit components outside of the SMPS controller, provide a fast start-up time, minimize standby power consumption, and minimize the required package size and cost of the SMPS controller. More particularly, the circuits and methods reduce, or at least maintain, the pin count of the SMPS controller as compared with prior techniques for charging an SMPS controller power supply.

The SMPS controller is integrated with an SMPS power stage in a single package. The SMPS power stage includes a power switch that serves two functions. During normal operation of the SMPS, the power switch switches an SMPS input current, e.g., on the primary side of a transformer, in order to provide the power (voltage and current) required by a load of the SMPS. Additionally, during a start-up phase of the SMPS, the power switch conducts current from the SMPS input source to the SMPS controller power supply, thereby charging the SMPS controller power supply with the energy necessary for the SMPS to enter its normal operational mode. A high-voltage supply lead (pin) of the package is connected to the power switch, and is used during both the start-up phase and the normal operational mode; no additional high-voltage lead is required to implement the start-up charging of the SMPS controller power supply.

During normal operational mode, an SMPS controller senses (measures) the voltage of the SMPS input source for a variety of reasons. For example, any overvoltage or undervoltage (brownout) condition at the SMPS input source should be detected so that the SMPS controller may take corrective action. The SMPS controller includes an input voltage sensing lead for this purpose. The embodiments described herein re-use this input voltage sensing lead during the start-up phase of the SMPS. More particularly, the input voltage sensing lead, which is typically driven by a divided-down version of a high-voltage input source of the SMPS, is used to provide a control signal to the power switch during the start-up phase. The voltage at, or current flowing into, the input voltage sensing lead turns on the power switch which, in turn, conducts current to the SMPS controller power supply. This current charges the power supply with energy so that the SMPS controller may enter its normal operational mode. Once normal operational mode of the SMPS is entered, the input voltage sensing lead converts to its normal role of sensing the SMPS input source voltage for purposes, e.g., of detecting overvoltage or undervoltage of the SMPS input source power.

In sub-embodiments of the circuits and methods herein, the start-up use of the input voltage sensing lead for controlling the power switch and the lead's normal-mode use of sensing the input source voltage is separated by an initialization delay period. During this delay period, the voltage at the input voltage sensing lead may be actively discharged in order to reduce the voltage at this node to a level consistent with a voltage that is expected during normal operation of the SMPS. This prevents, e.g., a high voltage that is built up during the start-up charging of the SMPS controller power supply as being misinterpreted as an overvoltage condition of the SMPS input source at the beginning of the SMPS's normal operation.

Various embodiments will now be described in the following description and the associated figures. These embodiments provide particular examples for purposes of explanation, and are not meant to limit the invention. Features and aspects from the example embodiments may be combined or re-arranged, except where the context does not allow this. Several embodiments are presented in the form of electrical circuits, including electrical components having specific values. One skilled in the art will recognize that the circuit embodiments may be modified, e.g., by changing component values, to meet the needs of particular applications. For these embodiments, the specific topology of the disclosed circuits and the specific components used therein are not intended to limit the invention.

The embodiments are directed to an SMPS and methods therein. SMPS are, generally, well-known in the art. In order to avoid obfuscating the unique aspects of the invention, well-known aspects related to the control of the SMPS are not discussed in detail, and are shown in block diagram form within the figures. Such well-known aspects include determining the frequency and duty cycle for the switching, e.g., using a voltage output of the SMPS to determine and/or adjust such parameters using closed-loop SMPS control, or setting such parameters to fixed values for open-loop SMPS control. Similarly, detailed techniques to address fault conditions (e.g., overvoltage, brownout) that are detected at the input voltage sensing lead are not addressed herein, as such techniques are also well-known. Instead, the following description focusses on the unique aspects of charging the SMPS controller power supply using a power switch, and using the input voltage sensing lead for the control of the power switch during the start-up phase of the SMPS.

SMPS may be implemented using a variety of topologies such as flyback, forward, buck, boost, buck-boost, etc. The techniques described herein apply similarly to several such topologies. In order to avoid unnecessary complexity, the example embodiments will be described using a limited set of topologies, with the understanding that the invention may be similarly implemented within other SMPS topologies also.

FIG. 1 illustrates an embodiment of an SMPS 100, including circuitry for charging a power supply $V_{CC}$ of an SMPS controller 140 within the SMPS 100. The SMPS 100 inputs alternating current (AC) power from, e.g., a mains supply, and supplies output power to a load 130 of the SMPS 100 at an output voltage $V_{OUT}$. The illustrated SMPS 100 includes an input rectifier 110, a power conversion circuit 120, the load 130, and the SMPS controller 140.

The input rectifier 110 is implemented using four power diodes in a conventional bridge configuration. The input rectifier 110 inputs an AC voltage $V_{AC\_IN}$ and outputs a direct current (DC) voltage $V_{DC\_IN}$, which is typically a relatively high voltage. The input rectifier 110 is shown as optional, as some applications may directly provide DC power. For example, a portable device may be battery powered, in which case a battery supplies DC power without the need for a rectifier. In another example, an upstream power supply (SMPS or otherwise) may supply DC power to the SMPS 100. A bulk capacitor $C_{BULK}$ filters the DC voltage $V_{DC\_IN}$.

Figure 2:
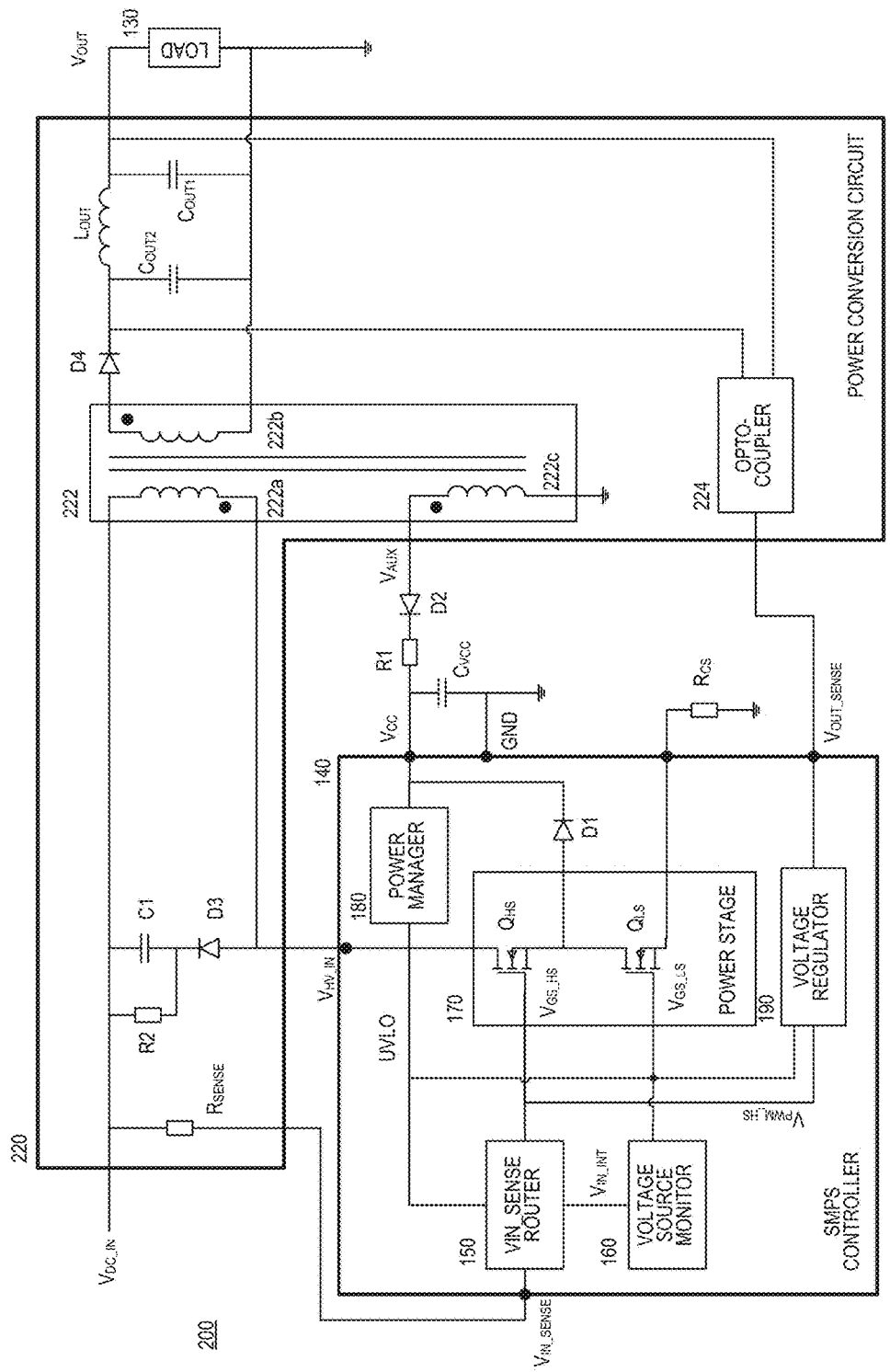
FIG. 2 illustrates an SMPS similar to that of FIG. 1, but which also shows additional circuitry for an embodiment wherein the SMPS is a flyback converter.
Figure 3:
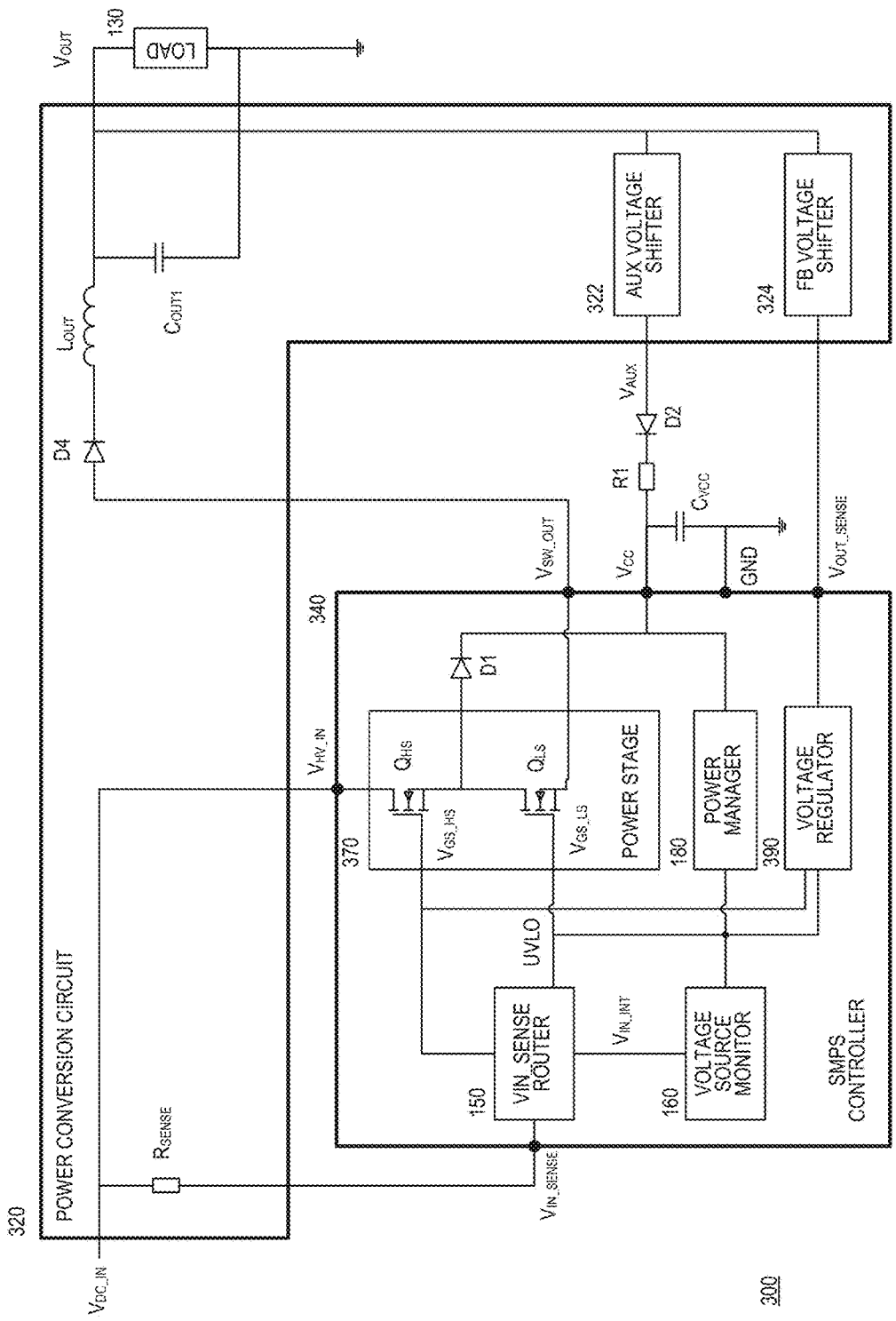
FIG. 3 illustrates an SMPS similar to that of FIG. 1, but which also shows additional circuitry for an embodiment wherein the SMPS is a buck converter.

The power conversion circuit 120 inputs the DC voltage $V_{DC\_IN}$ and provides the output voltage $V_{OUT}$ to the load 130, as well as providing an auxiliary supply $V_{AUX}$ used for powering the SMPS controller 140 during the SMPS's normal operating mode. The specific circuitry within the power conversion circuit 120 is dependent upon the SMPS topology. For an isolated SMPS topology, the power conversion circuit 120 includes a transformer for stepping the input voltage $V_{DC\_IN}$ up or down. A non-isolated SMPS topology, such as a buck converter, does not include a transformer, but instead includes a inductor. For both isolated and non-isolated topologies, the power conversion circuit 120 typically includes circuitry for rectifying and filtering an intermediate voltage in order to produce the output voltage $V_{OUT}$. More detailed exemplary circuits of the power conversion circuit 120 are illustrated in FIGS. 2 and 3, and described hereinbelow.

The SMPS controller 140 controls the power flow through the power conversion circuit 120, in order to supply the power needed by the load 130. The SMPS controller 140 includes a power stage 170 integrated within the same package. The power stage 170 and the other components of the SMPS controller 140 may be integrated on a single semiconductor die, or may be spread across multiple semiconductor dies that are included in a single package, e.g., in a multi-chip module (MCM). The SMPS controller 140 additionally includes a $V_{IN}$ sense router 150, a source voltage monitor 160, a power manager 180, and a voltage regulator 190.

The SMPS controller 140 and its constituent parts may be implemented using a combination of analog hardware components (such as transistors, amplifiers, diodes, comparators, and resistors), and processor circuitry that includes primarily digital components. The processor circuitry may include one or more of a digital signal processor (DSP), a general-purpose processor, and an application-specific integrated circuit (ASIC). The controller 140 may also include memory, e.g., non-volatile memory such as flash, that includes instructions or data for use by the processor circuitry, and one or more timers.

Figure 5:
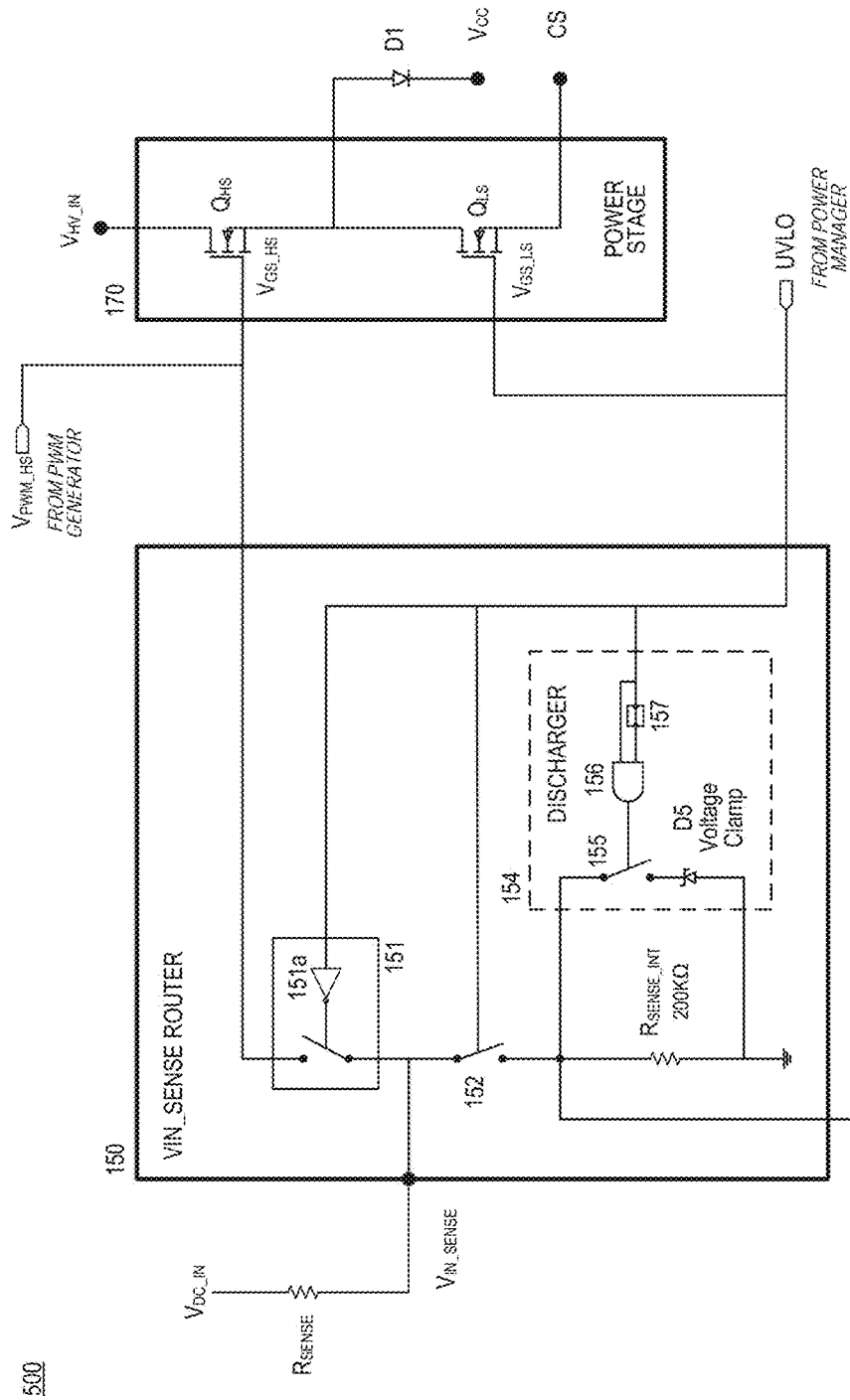
FIG. 5 illustrates detailed circuitry for an embodiment of a $V_{IN\_SENSE}$ router, such as that shown in FIG. 1.

The $V_{IN}$ sense router 150 includes routing switches 151, 152 that connect a $V_{IN\_SENSE}$ lead (pin) to the control terminal of a high-side power switch $Q_{HS}$ of the power stage 170 during a start-up phase of the SMPS 100, and to the source voltage monitor 160 during normal operation of the SMPS 100. In preparation for entry into normal operation of the SMPS 100, the $V_{IN}$ sense router 150 may couple the $V_{IN\_SENSE}$ lead to a discharger 154 therein, which is configured to quickly discharge the voltage at the $V_{IN\_SENSE}$ lead to a normal operating voltage. An undervoltage lockout (UVLO) signal is provided to the $V_{IN}$ sense router 150 and determines where the $V_{IN\_SENSE}$ lead (pin) is routed, i.e., the UVLO signal indicates whether the SMPS 100 is in a normal operational mode or not. The discharger 154 is shown as optional, as it may not be included in some embodiments. More detailed circuitry for the $V_{IN}$ sense router 150 is illustrated in FIG. 5.

The source voltage monitor 160 includes a line overvoltage detector 162 and a brown in/out (undervoltage) detector 164. During normal operating conditions, the $V_{IN\_SENSE}$ lead is connected, directly or indirectly, to the source voltage monitor 160 so that overvoltage and/or undervoltage conditions of the source input voltage $V_{DC\_IN}$ (e.g., as caused by overvoltage/undervoltage of the AC mains voltage $V_{AC\_IN}$) may be detected. (During start-up or other abnormal operating conditions when the $V_{IN\_SENSE}$ lead is not routed to the source voltage monitor 160, the source voltage monitor 160 may be disabled. Such disabling may be controlled by the UVLO or a similar signal from the power manager 180.) Responsive to detecting an abnormal condition of the source input voltage $V_{DC\_IN}$, the source voltage monitor 160 indicates the abnormal condition to other components of the SMPS controller 140. For example, the overvoltage detector 162 may signal an overvoltage condition to the voltage regulator 190 so that the PWM generator 192 therein may alter a PWM signal $V_{PWM\_HS}$ provided to the power stage 170 in order to reduce the amount of power being transferred through the power conversion circuit 120. Conversely, the brown in/out detector 164 may signal an undervoltage condition to the voltage regulator 190, so that the PWM generator 192 therein may alter the PWM signal $V_{PWM\_HS}$ provided to the power stage 170 in order to increase the amount of power being transferred through the power conversion circuit 120. For severe over or undervoltage conditions, the source voltage monitor 160 may indicate to the power manager 180 that normal operation of the SMPS 100 should be suspended. The overvoltage and brownout detectors 162, 164 are typically implemented using comparators, as is conventional within source voltage monitors.

The voltage regulator 190 includes a pulse-width-modulation (PWM) signal generator 192 which generates the PWM signal $V_{PWM\_HS}$ during normal operation of the SMPS 100. The generated PWM signal $V_{PWM\_HS}$, which drives the control terminal voltage $V_{GS\_HS}$ of the high-side power switch $Q_{HS}$ during normal operation of the SMPS, determines the amount of power transferred through the power conversion circuit 120. A feedback controller, such as a proportional-integral-derivative (PID) controller (not shown for ease of illustration), within the voltage regulator 190 determines parameters for the PWM generator 192 based upon the SMPS output voltage $V_{OUT}$, as measured at a $V_{OUT\_SENSE}$ lead of the SMPS controller 140. Alternatively, an open-loop controller may generate fixed parameters that are not based upon the SMPS output voltage $V_{OUT}$. Closed-loop feedback and open-loop controllers are well-known in the art, and will not be described in further detail herein. The PWM generator 192 may generate a PWM signal having a fixed frequency in which the duty cycle of the PWM signal is varied, may generate a signal in which the frequency is varied and the duty cycle held fixed, or may generate a signal in which both the frequency and duty cycle are varied. While the PWM generator 192 illustrated in FIG. 1 only generates one PWM signal $V_{PWM\_HS}$, some SMPS topologies require the generation of multiple PWM signals. For example, a half-bridge (HB) converter requires the generation of two PWM signals, whereas a full-bridge (FB) converter using phase-shifted modulation requires the generation of four PWM signals. When the SMPS 100 is not in a normal operating mode, e.g., as indicated by an inactive UVLO signal during a startup phase of the SMPS 100, the voltage regulator 190 is typically disabled and the PWM generator 192 does not generate the PWM signal $V_{PWS\_HS}$, e.g., this signal may be floating.

The power stage 170 illustrated in FIG. 1 includes high-side and low-side power switches $Q_{HS}$, $Q_{LS}$. The low-side power switch $Q_{LS}$ is turned on such that it conducts when the UVLO signal indicates normal operation of the SMPS 100. (The UVLO signal is coupled to the switch control terminal, e.g., gate, of the low-side switch $Q_{LS}$.) The input (e.g., drain) of the low-side power switch $Q_{LS}$ is connected to the output (e.g., source) of the high-side switch $Q_{HS}$. The output (e.g., source) of the low-side switch $Q_{HS}$ is routed to a current sense (CS) lead of the SMPS controller 140. By connecting a current sense resistor $R_{CS}$ to the CS lead, a CS voltage may be measured at the CS lead and used to derive a current flowing through the power stage 170. This derived current may be provided to the voltage regulator 190, in order to determine the amount of power transferred through the power conversion circuit 120. During periods when the UVLO signal does not indicate normal operation, e.g., during a startup phase of the SMPS 100, the low-side switch $Q_{LS}$ does not conduct.

The high-side power switch $Q_{HS}$ includes a switch control terminal (e.g., gate), and an input terminal (e.g., drain) that is connected to the high-voltage source lead $V_{HV\_IN}$ of the SMPS controller 140. During normal operation of the SMPS 100, the high-side switch control terminal is driven by the PWM generator 192, and is not connected to the $V_{IN\_SENSE}$ lead. During the startup phase of the SMPS 100, the high-side switch control terminal is instead connected, via the $V_{IN\_SENSE}$ router 150, to the $V_{IN\_SENSE}$ lead. (The PWM generator 192 is disabled during the startup phase of the SMPS 100, and does not generate any signal $V_{PWM\_HS}$ to drive the high-side switch control terminal.) Once the voltage $V_{GS\_HS}$ at the high-side switch control terminal reaches a turn-on threshold voltage, the high-side power switch $Q_{HS}$ turns on and begins conducting current from the high-voltage source lead $V_{HV\_IN}$. Because the low-side switch $Q_{LS}$ is turned off during the start-up phase, this current flows through a blocking diode D1 and charges the SMPS controller power supply $V_{CC}$ and its capacitor $C_{VCC}$, thereby increasing the voltage of $V_{CC}$.

The power switches $Q_{HS}$, $Q_{LS}$ are illustrated in FIG. 1 as enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. In many applications, driver circuits, which are not shown in FIG. 1 for ease of illustration, may be included upstream of the control terminals (e.g., gates) for the power switches $Q_{HS}$, $Q_{LS}$.

Figure 4:
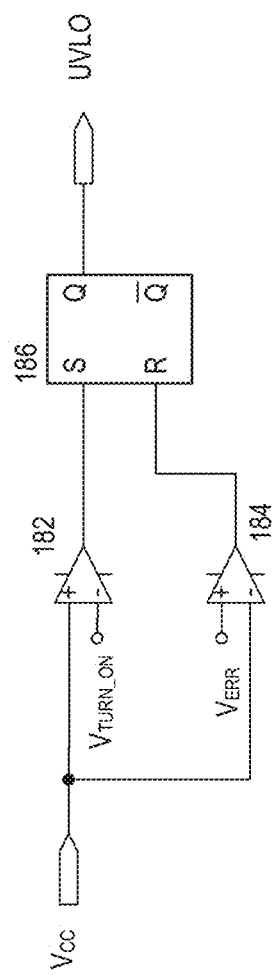
FIG. 4 illustrates detailed circuitry for an embodiment of a power manager, such as that shown in FIG. 1.

The power manager 180 monitors the voltage of the SMPS controller power supply $V_{CC}$ and detects when this voltage reaches a threshold level $V_{TURN\_ON}$ (e.g., 16V) that is high enough to begin normal operation of the SMPS 100. Upon such detection, i.e., $V_{CC} > V_{TURN\_ON}$, the power manager 180 sets the UVLO signal thereby indicating impending commencement of normal operation. The UVLO signal is provided to the $V_{IN}$ sense router 150, the source voltage monitor 160, the voltage regulator 190, and the low-side power switch $Q_{LS}$, thereby indicating to each of these circuits that normal SMPS operation may commence either immediately or after a delay. Once normal operation is begun, the power manager 180 may continue monitoring the voltage $V_{CC}$ to ensure it remains within an acceptable operating range. Should the voltage $V_{CC}$ fall below an unacceptably low voltage level $V_{ERR}$ (e.g., 10V), i.e., it is detected that $V_{CC} < V_{ERR}$, the power manager 180 may reset the UVLO signal thereby indicating that normal operation should cease. Responsive to such a reset of the UVLO signal, the SMPS controller 140 may shut-down or may re-enter the startup phase. Detailed circuitry for the power manager 180 is illustrated in FIG. 4, which is described further below.

When the SMPS controller 140 enters normal operational mode, the low-side power switch $Q_{LS}$ is enabled (conducts) and presents a lower-impedance path to the current flowing out from the high-side power switch $Q_{HS}$, as compared to the conduction path through the diode D1. Hence, current is not supplied to the SMPS power supply $V_{CC}$ via the diode D1. Instead, the power conversion circuit 120 provides an auxiliary supply $V_{AUX}$ that supplies current to $V_{CC}$ via a diode D2 and a resistor R1. The auxiliary supply $V_{AUX}$ may be derived from the SMPS output supply $V_{OUT}$, or may be provided by some other source such as an auxiliary winding of a transformer within the power conversion circuit 120. Examples of such auxiliary supplies are provided in FIGS. 2 and 3, and described below.

FIG. 2 illustrates an SMPS circuit 200 having an isolated topology in a flyback configuration. The SMPS controller 140 is largely the same as that illustrated in FIG. 1. The power conversion circuit 220 includes a transformer 222 having a primary winding 222a, a secondary winding 222b, and an auxiliary winding 222c. The primary winding 222a couples the DC input source voltage $V_{DC\_IN}$ to the high-voltage source lead $V_{HV\_IN}$ of the SMPS controller 140. During a startup phase of the SMPS 200, current flows from the DC input source voltage $V_{DC\_IN}$ through the primary winding 222a and into the lead $V_{HV\_IN}$, thereby charging the SMPS controller power supply $V_{CC}$ via the high-side power switch $Q_{HS}$. (As explained previously, the $V_{IN}$ sense router 150 routes a signal to the control terminal of the high-side power switch $Q_{HS}$ during the start-up phase, thereby turning on the high-side power switch $Q_{HS}$.)

During normal operation of the SMPS 200, components R2, C1, D3 allow the SMPS controller 140, and the power stage 170 therein, to switchably draw current from the DC input source voltage $V_{DC\_IN}$, thereby generating an AC voltage across the primary winding 222a. The AC voltage generated across the primary winding 222a induces an AC voltage across the auxiliary winding 222c which, in turn, provides current to the SMPS controller power supply $V_{CC}$ from the auxiliary supply $V_{AUX}$. A blocking diode D2 ensures that only positive current flows into $V_{CC}$. A resistor R1 and the capacitor $C_{VCC}$ filter (smooth) the resultant voltage at $V_{CC}$. The AC voltage across the primary winding 222a also induces an AC voltage across the secondary winding 222b. A diode D4 rectifies this AC voltage by ensuring that only positive current flows through the inductor $L_{OUT}$ and to the load 130. The inductor $L_{OUT}$ and capacitors $C_{OUT1}$, $C_{OUT2}$ filter the resultant voltage to produce the voltage $V_{OUT}$ provided to the load 130.

An opto-coupler 224 provides isolation between primary and secondary sides of the SMPS 200. The opto-coupler 224 inputs a voltage from the D4 output and the voltage $V_{OUT}$ provided to the load 130, and provides a feedback signal to the SMPS controller 140 at its $V_{OUT\_SENSE}$ lead, based upon these output voltages.

A sense resistor $R_{SENSE}$ connects the DC input source voltage $V_{DC\_IN}$ to the $V_{IN\_SENSE}$ lead of the SMPS controller 140, and serves to divide-down the voltage $V_{DC\_IN}$ to a level appropriate for use by the voltage source monitor 160 and the control terminal of the high-side power switch $Q_{HS}$.

FIG. 3 illustrates an SMPS circuit 300 having a non-isolated topology and configured as a buck converter. The SMPS controller 340 is largely the same as that described above for FIG. 1, with the noteworthy exception that the current sense (CS) lead is replaced by a $V_{SW\_OUT}$ lead. Rather than coupling the high-voltage input $V_{HV\_IN}$ to ground, the power stage 370 of FIG. 3 connects the input source voltage $V_{HV\_IN}$ to a diode D4 within the power conversion circuit 320. The voltage regulator 390 of FIG. 3 senses (measures) the output voltage $V_{OUT}$, but an optocoupler is not needed. Instead, a feedback voltage shifter 324 may be used to shift the output voltage $V_{OUT}$ to a usable range, e.g., as required by an analog-to-digital converter (ADC) within the voltage regulator 390. The feedback voltage shifter 324 is typically a conventional voltage divider including two resistors.

Because the power conversion circuit 320 includes no transformer, there is no auxiliary winding to supply power to the SMPS controller power supply $V_{CC}$. Instead, the output power $V_{OUT}$, or a variant thereof, may be used to power the SMPS controller 340. As illustrated in FIG. 3, the output voltage $V_{OUT}$ is input to an auxiliary voltage shifter 322, which shifts the output voltage $V_{OUT}$ to an appropriate voltage for powering the SMPS controller 340. The auxiliary voltage shifter 322 may be, e.g., a resistive voltage divider or a linear regulator.

FIG. 4 illustrates detailed circuitry for generating the UVLO signal, as might be included in the power manager 180 illustrated in FIG. 1. The UVLO signal generation is performed by a turn-on comparator 182, a low-voltage detection comparator 184, and an SR latch 186. The turn-on comparator 182 compares the SMPS controller supply voltage $V_{CC}$ against a turn-on threshold voltage $V_{TURN\_ON}$, e.g., 16V. Upon detecting that the SMPS controller supply voltage $V_{CC}$ exceeds the turn-on threshold voltage $V_{TURN\_ON}$, the comparator 182 indicates this detection to the set (S) input of the SR latch 186. The SR latch 186, in turn, activates the UVLO signal, thereby indicating to the other circuits within the SMPS controller 140 that normal operation may commence. The low-voltage detection comparator 184 compares the SMPS controller supply voltage $V_{CC}$ against a low-voltage error threshold $V_{ERR}$, e.g., 10V. Upon detecting that the SMPS controller supply voltage $V_{CC}$ falls below the low-voltage error threshold $V_{ERR}$, the low-voltage detection comparator 184 indicates an error condition to the reset (R) input of the SR latch 186. The SR latch 186, in turn, de-activates the UVLO signal, thereby indicating to the other circuits within the SMPS controller 140 that normal operation of the SMPS should cease. After a period of normal SMPS operation followed by an error condition due to low voltage on the SMPS supply voltage $V_{CC}$, the SMPS controller 140 may again enter the SMPS start-up phase in the same manner as when the SMPS 100 is initially powered on.

FIG. 5 illustrates detailed circuitry for an embodiment of the $V_{IN\_SENSE}$ router 150 that is shown in FIG. 1, together with related circuitry connected to the $V_{IN\_SENSE}$ router 150. The $V_{IN\_SENSE}$ router 150 includes routing switches 151, 152, discharger 154, and voltage-divider resistor $R_{SENSE\_INT}$. The routing switches 151, 152 are controlled by the UVLO signal, and are not enabled simultaneously. More particularly, the first routing switch 151 is closed (conducts) when the UVLO signal is not active, whereas the second routing switch 152 is closed (conducts) when the UVLO signal is active. Stated alternatively, the first routing switch 151 is controlled by an inverted version of UVLO, as indicated by an inverter 151a, whereas the second routing switch 152 is directly controlled by the UVLO signal.

The first routing switch 151 defaults to a closed (conducting) position during the start-up phase of the SMPS 100, i.e., before the UVLO signal is active. Such a normally-closed position is inherent within some transistors, e.g., depletion-mode MOSFETs, junction FETs (JFETs), and normally-on high electron mobility transistors (HEMTs). Such transistors default to a conducting state when no voltage is presented at their control terminal (e.g., gate). Other transistors may be biased such that they default to a closed position. For example, an enhancement-mode MOSFET could include a pullup resistor between its gate terminal and the $V_{IN\_SENSE}$ lead, thereby forcing it to a conducting state during a start-up phase of the SMPS 100. As another example, an NPN BJT may be biased on by including a pullup resistor between its base terminal and the $V_{IN\_SENSE}$ lead, thereby forcing it to a conducting state during the start-up phase of the SMPS 100. The first routing switch 151 is opened (turned off) responsive to the UVLO signal becoming active.

Conversely, the second routing switch 152 defaults to an open position during the start-up phase of the SMPS 100, i.e., before the UVLO signal is active. The second routing switch 152 closes, i.e., conducts current, responsive to the UVLO signal becoming active. The second routing switch 152 could be, e.g., an enhancement-mode MOSFET or an NPN BJT, and no pullup biasing resistor is required.

Once the UVLO signal is activated, the first routing switch 151 opens and the second routing switch 152 closes. With the second routing switch 152 closed, a voltage divider is formed by an internal sense resistor $R_{SENSE\_INT}$ and the external resistor $R_{SENSE}$. A divided voltage $V_{IN\_INT}$ at the connection of the sense resistors $R_{SENSE\_INT}$, $R_{SENSE}$ is output from the $V_{IN\_SENSE}$ router 150 and provided to the source voltage monitor 160. During normal operation of the SMPS 100, the source voltage monitor 160 uses this divided voltage $V_{IN\_INT}$ to detect error conditions, e.g., overvoltage or brownout, at the SMPS input source, as described previously.

When the UVLO signal is initially activated and the routing switch 152 closes, a relatively high voltage may exist at the $V_{IN\_SENSE}$ lead, due to the charge built-up during the start-up phase when the routing switch 151 was closed. This initial high voltage could be misinterpreted by the source voltage monitor 160 as indicating a line overvoltage condition. Preferred sub-embodiments include mitigation techniques for preventing such misinterpretation.

In a first sub-embodiment, normal operation of the SMPS controller 140 is delayed to begin an initialization delay $T_{INIT}$ after the UVLO signal is activated. For example, the source voltage monitor 160 may delay monitoring its voltage input $V_{IN\_INT}$ until $T_{INIT}$ after UVLO activation. Similarly, the PWM generator 192 may delay generation of its output PWM signal $V_{PWM\_HS}$ until $T_{INIT}$ after UVLO activation. The initialization delay $T_{INIT}$ should be chosen large enough to ensure that the divided voltage $V_{IN\_INT}$ has settled to a normal operating range before the source voltage monitor 160 begins monitoring this voltage $V_{IN\_INT}$ and, potentially, before corrective actions are taken (e.g., altering PWM signals) based upon this voltage $V_{IN\_INT}$.

In order to minimize ohmic losses and associated standby power consumption, the sense resistors $R_{SENSE\_INT}$, $R_{SENSE}$ are preferably chosen to have relatively high resistances, e.g., 200 KΩ and 20 MΩ respectively. This, however, has the unfortunate consequence that the voltage $V_{IN\_INT}$ potentially takes an excessive period of time to settle out, thereby requiring a large initialization delay $T_{INIT}$ and an associated lengthy start-up time for the SMPS 100. This problem is mitigated by a preferred second sub-embodiment.

The second sub-embodiment includes the discharger circuit 154, which is configured to quickly discharge the divided voltage $V_{IN\_INT}$ after the UVLO signal is activated. The discharger 154 includes a discharge switch 155, an AND gate 156, a pulse generator 157, and a voltage clamp (diode) D5.

Upon activation of the UVLO signal, the pulse generator 157 generates a pulse having a duration of $T_{DLY\_CLAMP}$. The pulse generator 157 is preferably implemented using a digital counter (e.g., a cascaded series of D flip flops) driven by an oscillator. In another implementation, the pulse generator $T_{CLAMP}$ is implemented using an analog delay line wherein the duration $T_{DLY\_CLAMP}$ is determined by a capacitor therein. Digital counters and analog delay lines are well-known in the art, and will not be described further herein.

The pulse generated by the pulse generator 157 is ANDed, using AND gate 156, with the UVLO signal. (This AND operation ensures that the discharge switch 155 is not erroneously closed while the first routing switch 151 is conducting.) The resultant signal is used to control the discharge switch 155, which is typically closed for the duration $T_{DLY\_CLAMP}$. (For the anomalous case wherein the UVLO signal is deactivated during the generated pulse, the pulse provided to the discharge switch 155 is abbreviated to something less than the duration $T_{DLY\_CLAMP}$) During the pulse, which lasts for the duration $T_{DLY\_CLAMP}$ after UVLO signal activation, the divided voltage $V_{IN\_INT}$ is shunted to ground via the clamping diode D5. The diode D5 has a reverse breakdown voltage, which clamps the divided voltage $V_{IN\_INT}$ to a clamped value, e.g., 2V, such that the divided voltage is not discharged to too low of a voltage by the discharger 154. More particularly, the discharger 154 should discharge the voltage $V_{IN\_INT}$ to a voltage that is between a lower voltage threshold that would indicate a brownout condition, and an upper voltage threshold that indicates an overvoltage condition. In other words, the discharger 154 discharges the divided voltage $V_{IN\_INT}$ to be within a normal operating range so that normal operation of the SMPS 100 may begin.

As in the first sub-embodiment, the second sub-embodiment also requires that normal operation of the SMPS controller 140 be delayed to begin at a time delay after the UVLO signal is activated. The initialization time delay $T_{INIT\_DIS}$ required in the second sub-embodiment is, however, considerably shorter than that required in the first sub-embodiment, i.e., $T_{INIT\_DIS} \ll T_{INIT}$. Note, also, that the initialization time $T_{INIT\_DIS}$ for the second sub-embodiment is longer than the discharge pulse duration $T_{DLY\_CLAMP}$, i.e., $T_{INIT\_DIS} > T_{DLY\_CLAMP}$. In other words, the SMPS controller 140 should not begin normal operating mode until after the discharger 154 has completed its discharging of the divided voltage $V_{IN\_INT}$.

The discharge switch 155 should be a normally-open switch, and will typically be a transistor of the same type as the second routing switch 152, e.g., an enhancement-mode MOSFET, NPN BJT. While the above description describes discharging the divided voltage $V_{IN\_INT}$ during the initialization time $T_{INIT\_DIS}$, the divided voltage $V_{IN\_INT}$ may instead be charged to a larger voltage during this period. The initialization time $T_{INIT}$, $T_{INIT\_DIS}$ is typically stored in a memory of the SMPS controller 140, and is determined based upon a capacitance of the $V_{IN\_SENSE}$ lead, together with the resistances of the sense resistors $R_{SENSE\_INT}$, $R_{SENSE}$.

Figure 6:
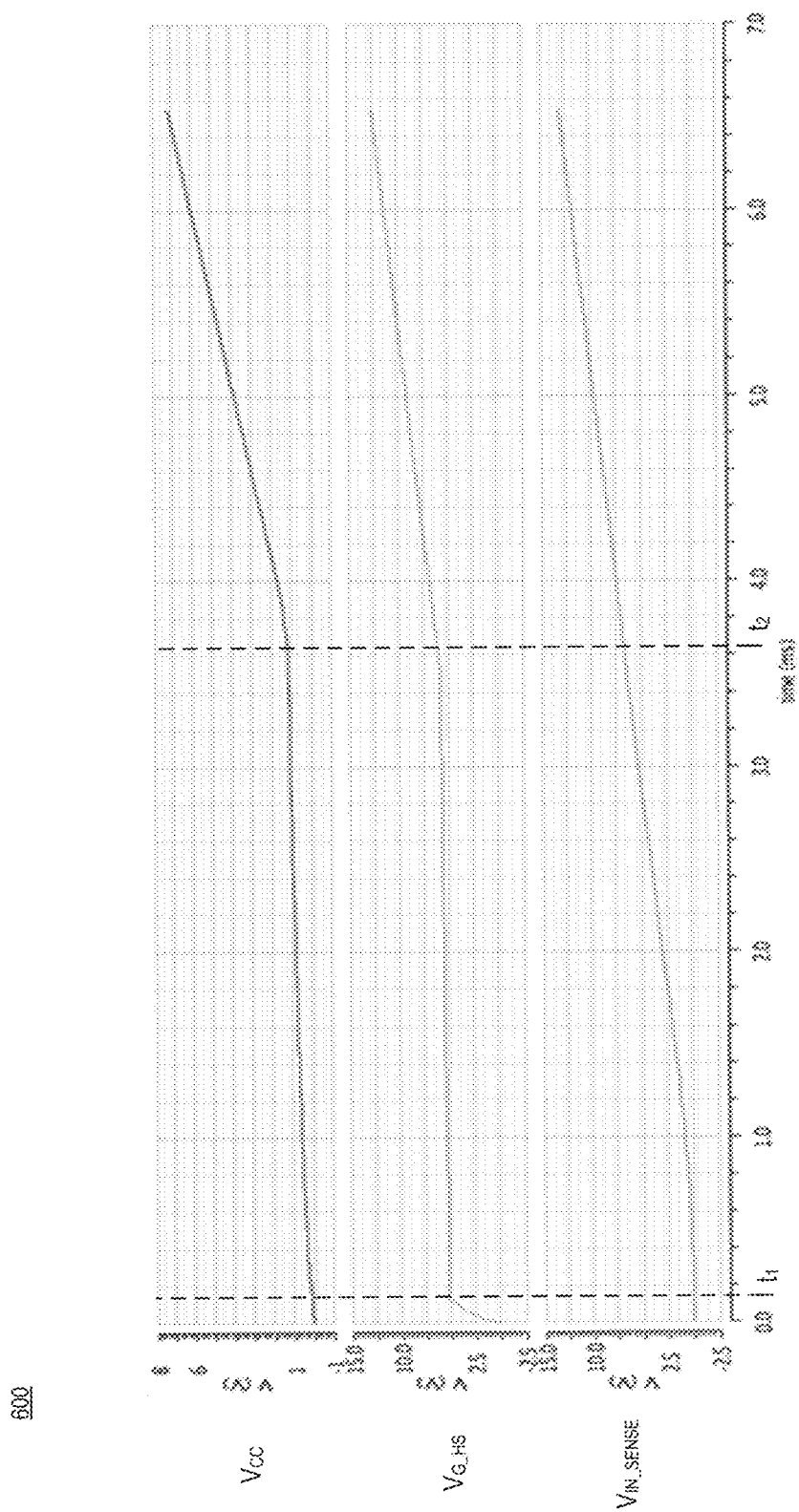
FIG. 6 illustrates voltage waveforms associated with the SMPS controller of FIG. 1, during a start-up phase of the SMPS when the SMPS controller power supply is being charged.

FIG. 6 illustrates voltage waveforms 600 corresponding to nodes of the SMPS controller 140 of FIG. 1 during a start-up phase of the SMPS 100 while the SMPS controller power supply $V_{CC}$ is being charged. The input source voltage, e.g., $V_{AC\_IN}$, is connected at time t=0, and the high-voltage DC input source voltage $V_{HV\_IN}$, which is not shown, begins to rise. Because this voltage $V_{HV\_IN}$ is attached to the drain of the high-side power switch $Q_{HS}$, the gate voltage, denoted $V_{G\_HS}$ in FIG. 6, quickly rises until it reaches the gate threshold voltage. Once its gate voltage reaches this threshold, the high-side power switch $Q_{HS}$ starts conducting. This occurs in FIG. 6 at time $t_1$, which is when the gate voltage $V_{G\_HS}$ reaches a turn-on voltage of approximately 5V. Current is then conducted through the high-side power switch $Q_{HS}$ and charges $V_{CC}$. As shown in FIG. 6, the voltage $V_{CC}$ begins rising at time $t_1$. At time $t_2$, the voltage at the $V_{IN\_SENSE}$ lead has risen to the level of the gate voltage $V_{G\_HS}$. Thereafter, the gate voltage $V_{G\_HS}$ follows the $V_{IN\_SENSE}$ voltage. The voltage at $V_{CC}$, which is attached to the source terminal of the powerswitch $Q_{HS}$, follows the gate voltage $V_{G\_HS}$, but reduced by the gate-to-source voltage $V_{GS\_HS}$. (This gate-to-source voltage $V_{GS\_HS}$ is approximately the same as the turn-on threshold for the high-side power switch $Q_{HS}$.) The voltage at $V_{CC}$ continues to rise until the turn-on threshold $V_{TURN\_ON}$ is reached, at which time the first routing switch 151 is disabled. (The waveforms 600 of FIG. 6 do not extend to the time at which the turn-on voltage threshold $V_{TURN\_ON}$ is reached.)

Figure 7:
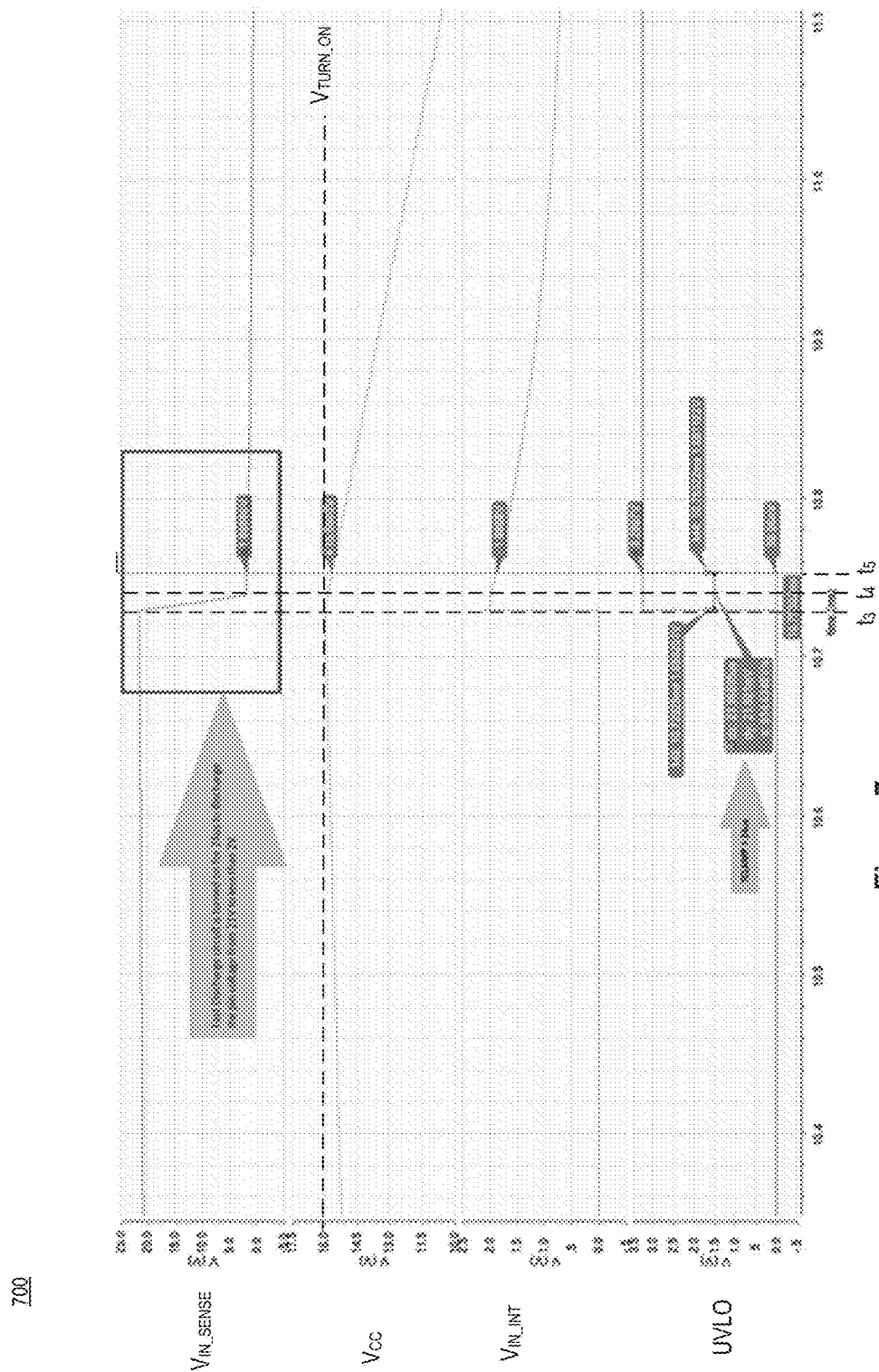
FIG. 7 illustrates voltage waveforms associated with the SMPS controller of FIG. 1, when the start-up phase of the SMPS has ended and normal operation is about to begin.

FIG. 7 illustrates voltage waveforms 700 corresponding to nodes of the SMPS controller 140 of FIG. 1 during the transition from the start-up phase to normal operating mode. These waveforms 700 illustrate a case wherein the discharger 154 is in use. The voltage $V_{CC}$ rises until time $t_3$, at which point it is detected that the voltage $V_{CC}$ has reached the threshold $V_{TURN\_ON}$ (16V). This detection triggers the activation of the UVLO signal, as shown by its rising edge at time $t_3$. Prior to time $t_3$, the divided voltage $V_{IN\_INT}$ is pulled low by the resistor $R_{SENSE\_INT}$. At time $t_3$, the divided voltage $V_{IN\_INT}$ is coupled to the $V_{IN\_SENSE}$ lead, and immediately jumps to the lead's voltage of approximately 20V. The discharger 154 quickly discharges the divided voltage $V_{IN\_INT}$ to a clamp voltage corresponding to the reverse breakdown voltage of the diode D5. As shown in FIG. 7, this clamp voltage is 2V. The clamp voltage of 2V is maintained at the divided voltage $V_{IN\_INT}$ until the time $t_4$. Also between times $t_3$ and $t_4$, the voltage at the $V_{IN\_SENSE}$ lead drops to 2V. The discharger switch 155 remains closed for a time duration $T_{DLY\_CLAMP}$, i.e., until time $t_5=t_3+T_{DLY\_CLAMP}$. ($T_{DLY\_CLAMP}=24$ μs in the waveforms 700 of FIG. 7.) In the period between times $t_4$ and $t_5$, the diode D5 is not reverse biased, and the divided voltage $V_{IN\_INT}$ gradually reduces as if the discharge switch 155 were open. After time $t_5$, the divided voltage $V_{IN\_INT}$ is within a normal range, and the SMPS controller 140 may begin its normal operation, e.g., by the PWM generator 192 beginning to generate the PWM signal $V_{PWM\_HS}$. This normal operation is started $T_{INIT\_DIS}$ after time $t_3$, wherein $T_{INIT\_DIS}>T_{DLY\_CLAMP}$. In other words, normal operation starts at some point after the time $t_5$ in FIG. 7.

Figure 8:
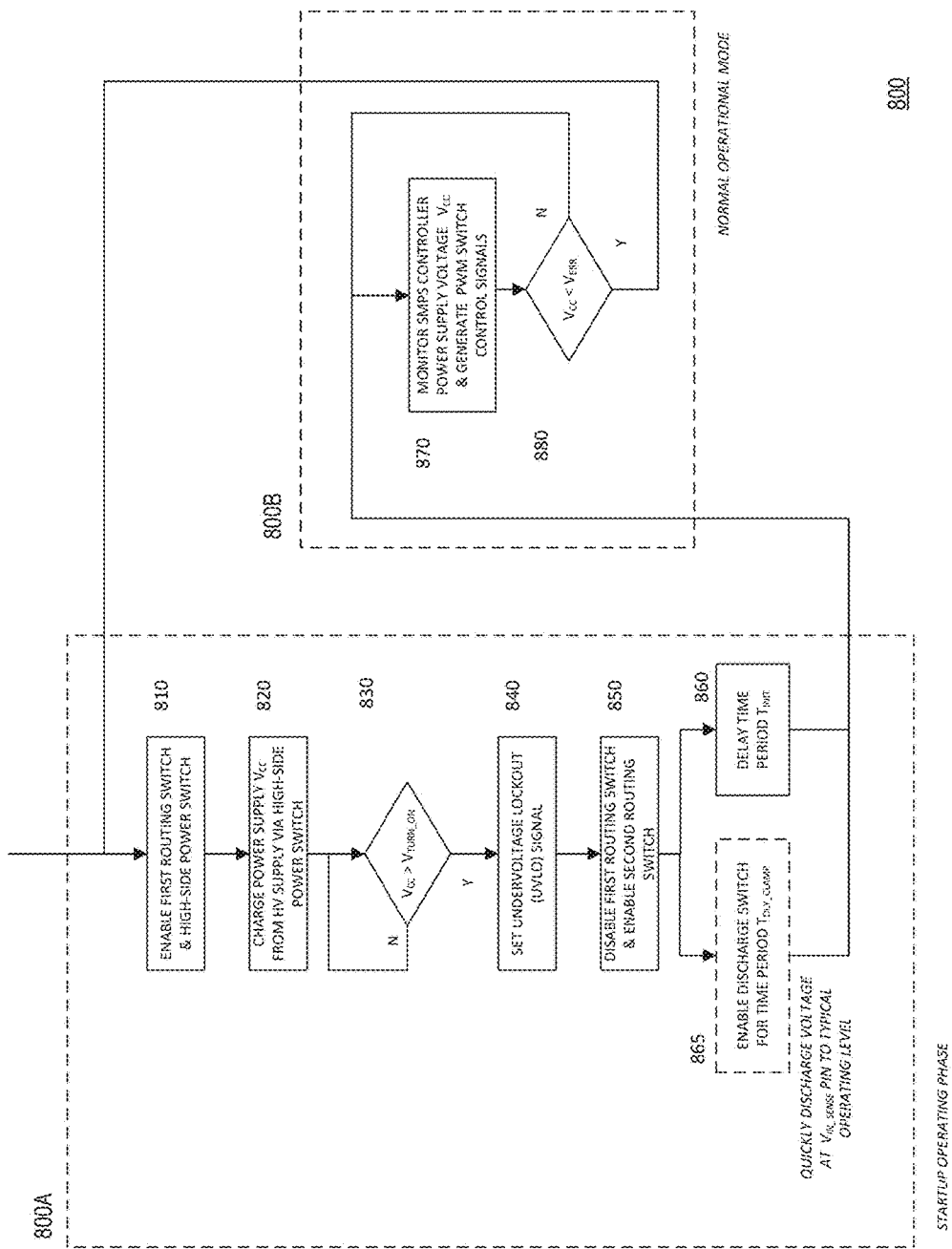
FIG. 8 illustrates a method, as implemented within an SMPS controller, for charging the SMPS controller power supply using an input voltage sensing pin.

FIG. 8 illustrates an embodiment of a method for charging an SMPS controller power supply $V_{CC}$ during a startup phase of an SMPS. This method may be implemented in an SMPS controller such as that illustrated in FIGS. 1, 2, and 5.

The method includes steps 800A performed during a start-up phase of an SMPS. Once the SMPS controller power supply $V_{CC}$ is charged to a level adequate for powering the SMPS controller, steps 800B, which correspond to normal operational mode, are performed.

The method 800 begins by enabling 810 a first routing switch such that it couples a $V_{IN\_SENSE}$ lead to the control terminal of a high-side power switch. An input voltage source is routed through the first routing switch and enables the high-side power switch such that it conducts current from a high-voltage input supply. The current conducted through the high-side power switch charges 820 the SMPS controller power supply $V_{CC}$. The charging continues until it is detected 830 that the SMPS controller power supply $V_{CC}$ has reached a turn-on threshold $V_{TURN\_ON}$. Responsive to such detection, an undervoltage lockout (UVLO) signal is activated 840. This triggers the disabling 850 of the first routing switch and the enabling 850 of a second routing switch, wherein the second routing switch connects the $V_{IN\_SENSE}$ lead to a source voltage monitor. In an optional discharge step 865, a discharge switch is closed for a duration of $T_{DLY\_CLAMP}$ in order to quickly discharge the voltage of the $V_{IN\_SENSE}$ lead. Regardless of whether the discharge step 865 is performed, operation is delayed 860 for a period of $T_{INIT}$. If the discharge step 865 is performed, the delay $T_{INIT}$ may be much shorter than if the discharge step 865 is not performed.

After delaying 860 for $T_{INIT}$, normal operating mode 800B may begin. This encompasses generating 870 PWM switch control signals for the high-side power switch, and monitoring 870 the SMPS power supply voltage $V_{CC}$. If the monitoring indicates 880 that the SMPS power supply voltage $V_{CC}$ has fallen below a low-voltage error threshold $V_{ERR}$, an error condition is indicated and normal operating mode is exited. The start-up phase 800A of the SMPS may then be re-entered by starting over at step 810.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An integrated controller and power stage for a s ode power supply (SMPS), the integrated controller and power stage comprising:

a high-voltage supply lead, an input voltage lead, an SMPS controller, a first power switch, a controller power supply and a source voltage monitoring circuit integrated in the same package, wherein the high-voltage supply lead provides a first point of external electrical contact to the package, wherein the input voltage lead provides a second point of external electrical contact to the package, wherein the first power switch comprises a first power switch control terminal, wherein the controller power supply is configured to power the SMPS controller, wherein the SMPS controller is operable to measure a supply voltage of the controller power supply and to couple, based upon the supply voltage, an input voltage at the input voltage lead to at most one of the first power switch control terminal and the source voltage monitoring circuit, wherein the first power switch is operable to connect the high-voltage supply lead to the controller power supply in order to charge the controller power supply during a start-up phase of the SMPS controller, during which the SMPS controller couples the input voltage to the first power switch control terminal, wherein the SMPS controller is operable to couple the source voltage monitoring circuit to the input voltage lead during a normal operating phase of the SMPS controller which follows the start-up phase.

2. The integrated controller and power stage of claim 1, further comprising:
a first routing switch interposed between the input voltage lead and the first power switch control terminal, wherein the first routing switch is turned on during the start-up phase of the SMPS controller.

3. The integrated controller and power stage of claim 2, further comprising:
a first comparator coupled to the controller power supply, the first comparator operable to detect that the supply voltage of the controller power supply is above a first voltage threshold and, responsive to said detection, to generate a first control signal that turns off the first routing switch, thereby turning off the first power switch.

4. The integrated controller and power stage of claim 2, further comprising:
a second comparator coupled to the controller power supply, the second comparator operable to detect that the supply voltage of the controller power supply is below a second voltage threshold and, responsive to said detection, to generate a second control signal that turns on the first routing switch.

5. The integrated controller and power stage of claim 1, further comprising:
a second routing switch interposed between the input voltage lead and the source voltage monitoring circuit, wherein the second routing switch is turned on during the normal operating phase of the SMPS controller.

6. The integrated controller and power stage of claim 5, further comprising:
a comparator coupled to the controller power supply, the comparator operable to detect that a voltage of the controller power supply is above a first voltage threshold;
a pulse generator operable to activate a discharge control signal responsive to said detection and to deactivate the discharge control signal a clamp time delay after said detection; and
a fast discharge circuit comprising a discharge switch that is coupled to the input voltage lead, the fast discharge circuit being operable to quickly discharge a voltage of the input voltage lead by turning on the discharge switch responsive to receiving the discharge control signal.

7. The integrated controller and power stage of claim 6, wherein the pulse generator comprises a digital counter.

8. The integrated controller and power stage of claim 6, wherein the pulse generator comprises an analog delay line.

9. The integrated controller and power stage of claim 1, wherein the first power switch is part of a power stage of the SMPS.

10. The integrated controller and power stage of claim 1, further comprising:
a second power switch that is coupled to the first power switch, and which is turned on during the normal operating phase of the SMPS controller.

11. The integrated controller and power stage of claim 10, wherein the second power switch is turned off during the start-up phase of the SMPS controller.

12. The integrated controller and power stage of claim 1, wherein the source voltage monitoring circuit further comprises a comparator operable to detect an overvoltage condition of the input voltage lead or an undervoltage condition of the input voltage lead and, responsive to said detection, generate a signal indicating an abnormal condition of an input voltage to the SMPS.

13. A switched-mode power supply (SMPS), comprising:
an integrated controller and power stage, comprising:
a high-voltage supply lead, an input voltage lead, an SMPS controller, a first power switch, a controller power supply and a source voltage monitoring circuit integrated in the same package,
wherein the high-voltage supply lead provides a first point of external electrical contact to the package,
wherein the input voltage lead provides a second point of external electrical contact to the package,
wherein the first power switch comprises a first power switch control terminal,
wherein the controller power supply is configured to power the SMPS controller,
wherein the SMPS controller is operable to measure a supply voltage of the controller power supply and to couple, based upon the supply voltage, an input voltage at the input voltage lead to at most one of the first power switch control terminal and the source voltage monitoring circuit,
wherein the first power switch is operable to connect the high-voltage supply lead to the controller power supply in order to charge the controller power supply during a start-up phase of the SMPS controller, during which the SMPS controller couples the input voltage to the first power switch control terminal,
wherein SMPS controller is operable to couple the source voltage monitoring circuit to the input voltage lead during a normal operating phase of the SMPS controller which follows the start-up phase;
a sense resistor coupled between the input voltage lead of the integrated controller and power stage, and a high-voltage supply of the SMPS.

14. The SMPS of claim 13, further comprising:
a transformer having an auxiliary winding, the auxiliary winding supplying power to the controller power supply during the normal operating phase of the SMPS controller.

15. The SMPS of claim 13, further comprising:
a rectification diode coupled to a switch output of the integrated controller and power stage;
a smoothing filter coupled to the rectification diode and operable to provide a smoothed output voltage to a load of the SMPS,
wherein the smoothed output voltage also supplies power to the controller power supply during the normal operating phase of the SMPS controller.

16. A method, in an integrated controller and power stage for a switched-mode power supply (SMPS), the integrated controller and power stage comprising a high-voltage supply lead, an input voltage lead, an SMPS controller, a first power switch comprising a first power switch control terminal, a controller power supply and a source voltage monitoring circuit integrated in the same package, for charging the controller power supply, the method comprising:
detecting that an input voltage at the input voltage lead is above a switch turn-on threshold;
responsive to said detecting, turning on the first power switch by connecting the input voltage lead to the first power switch control terminal, so as to connect the high-voltage supply lead to the controller power supply, thereby charging the controller power supply during a start-up phase of the SMPS controller;

measuring a supply voltage of the controller power supply and determining an end of the start-up phase of the SMPS controller based upon the measured supply voltage, responsive to determining the end of the start-up phase, disconnecting the input voltage lead from the first power switch control terminal, thereby ceasing the charging of the controller power supply via the first power switch, and subsequent to the start-up phase of the SMPS controller, coupling the source voltage monitoring circuit to the input voltage lead during a normal operating phase of the SMPS controller which follows the start-up phase.

17. The method of claim 16, further comprising:

detecting that the supply voltage of the controller power supply is above a first voltage threshold; and turning off the first power switch responsive to the detecting.

18. The method of claim 16, further comprising:

detecting, during the normal operating phase of the SMPS controller, that the supply voltage of the controller power supply is below a second voltage threshold;

responsive to the detecting, exiting the normal operating phase of the SMPS controller and turning on the first power switch so as to connect the high-voltage supply lead to the controller power supply, thereby charging the controller power supply during a re-start phase of the SMPS controller.

19. The method of claim 16, further comprising:

subsequent to turning off the first power switch, connecting the input voltage lead to the source voltage monitoring circuit; and subsequent to said connecting, commencing a normal operating phase of the SMPS controller.

20. The method of claim 16, further comprising:

responsive to turning off the first power switch, connecting the input voltage lead to the source voltage monitoring circuit;

subsequent to said connecting, discharging the input voltage lead by turning on a discharge switch for a discharge time period;

after the discharge time period, turning off the discharge switch; and subsequent to turning off the discharge switch, commencing a normal operating phase of the SMPS controller.

* * * * *

UNITED STATES PATENT AND TRADEMARK OFFICE
CERTIFICATE OF CORRECTION

PATENT NO. : 10,153,702 B2
APPLICATION NO. : 15/426647
DATED : December 11, 2018
INVENTOR(S) : Y. Teo et al.

Page 1 of 1

It is certified that error appears in the above-identified patent and that said Letters Patent is hereby corrected as shown below:

In the Claims

Column 14, Line 41 (Claim 1, Line 1), please change "s ode" to --switched-mode--

Signed and Sealed this
Twenty-sixth Day of February, 2019

Andrei Iancu
*Director of the United States Patent and Trademark Office*